Feb. 2, 1943.  I. P. POPOFF  2,310,115

VARIABLE SPEED PLANETARY TRANSMISSION FOR AUTOMOBILES

Filed June 21, 1939

Inventor
Ivan Peter Popoff

Patented Feb. 2, 1943

2,310,115

UNITED STATES PATENT OFFICE 2,310,115

VARIABLE SPEED PLANETARY TRANSMISSION FOR AUTOMOBILES

Ivan Peter Popoff, Lake, Wis.

Application June 21, 1939, Serial No. 280,219

4 Claims. (Cl. 74—282)

The invention relates to an epicyclic gear transmission for motor vehicles (or other machines) designed to give infinitesimal variation of the velocity ratio of the driven shaft relative to the driving engine shaft and also an automatic regulation of the load on the engine which is subjected to constantly varying gradient load. The principles involved, the method of operation and the constructional features of the invention will become evident from the following description and from the drawing attached hereto:

Figure 1:
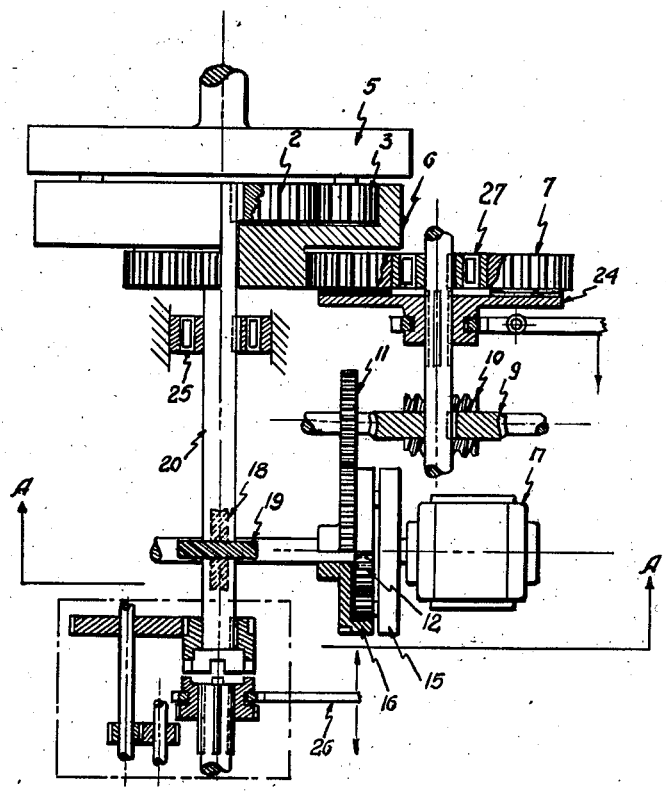
Fig. 1 is a sectional view.
Figure 2:
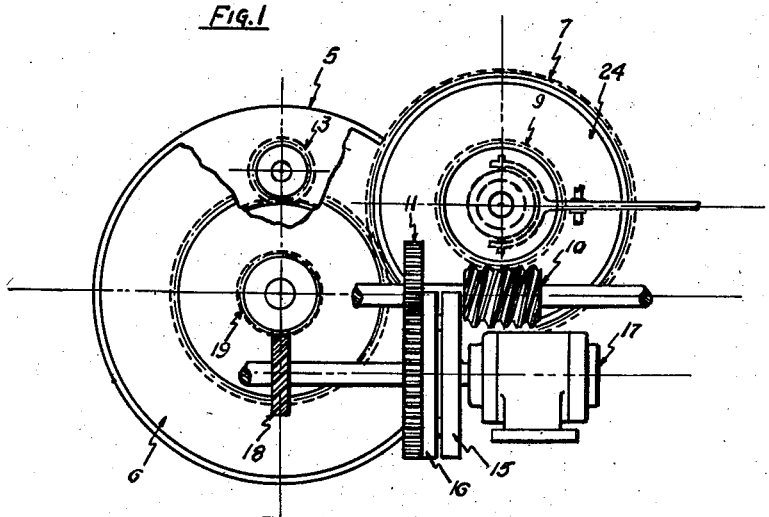
Fig. 2 is an external view looking from direction A—A to Fig. 1.

In Fig. 1 it can be seen that the transmission comprises a main epicyclic gear train of a certain velocity ratio and an auxiliary epicyclic gear train of a certain velocity ratio. The main epicyclic gear train consists of a driving member—the flywheel 5 (which in this epicyclic gear train is the arm), a driven member—the sun wheel 2 keyed to the driven shaft 20 and a floating (or controllable) member—the internal gear wheel 6. The auxiliary epicyclic gear train consist similarly of a driving member—the arm 15, a driven member—the sun wheel 12 coupled through gearing 18 and 19 to driven shaft 20, and a floating member 16 coupled to the main floating member 6 through the irreversible worm gearing 10 and 9, the one way clutch 27, and gears 11 and 7.

The one-way clutch 27 performs the following important functions:

1. When the vehicle is standing still and the engine runs at or below a predetermined speed, said clutch 27 allows the floating member 16 to rotate faster than member 6, but when the engine speed is increased above the predetermined idling speed, said one-way clutch 27 locks the controlling wheels 6 and 16 to equal speeds and the vehicle starts moving.

2. When the vehicle is running down a gradient said one-way clutch 27 allows the driven shaft 20 to rotate faster than the engine so that the effect of free wheeling is obtained.

3. It renders possible a reverse drive arrangement directly from the transmission.

The electric motor 17, forming with the vehicle's generator a regenerative unit, supplies the power for the auxiliary epicyclic gear train and maintains a predetermined constant speed until all members reach synchronous rotation with respect to the engine after which its speed increases with increase of the driven shaft's speed so that the synchronous rotation of all members is kept as close as possible.

The electric motor is utilised also for starting the engine from the storage battery by means of an arrangement of a pedal operated clutch 24 and a one-way brake 25 which is mounted in the vehicle's frame and prevents shaft 20 from reversing its rotation at starting. To start the engine the gear shifting lever 26 is placed in neutral position, as shown in the drawing, and the clutch 24 is engaged briefly which forces the engine into rotation.

The transmission works as follows:

At predetermined speeds of the driving shaft 1 and the electric motor 17 and the throttle pedal released, the driven shaft 20 is stationary. The fly wheel 5 with the planetary pinions 3 and the floating wheel 6 rotate in the same direction and their respective speeds, as well as the speed of the members of the auxiliary epicyclic gear train can be calculated from the following algebrical relations:

The velocity ratio R of the epicyclic gear train is:

$$R = \frac{\text{product of teeth in driving wheels}}{\text{product of teeth in driven wheels}}$$

or expressed in terms of speeds, $$R = \frac{\text{speed of last wheel relative to the arm}}{\text{speed of first wheel relative to the arm}}$$

Let the letters S and S', C and C' and A and A' denote the speeds in revolutions per minute of the sun wheels 2 and 12, control wheels 6 and 16 and arms 5 and 15, relative to a fixed framework, Then $$\frac{C-A}{S-A} = R \text{ and } \frac{C'-A'}{S'-A'} = R' \quad (1)$$

It should be noted that it is arbitrarily chosen that the sun wheel 2 is the first driver and the floating member 6 is the last driven of the epicyclic gear train although it is not so in the drawing, which however has no effect on the final results. The ratio R is minus if the first and last wheels rotate in opposite direction while the arm is fixed and it is plus if they rotate in the same direction while the arm is fixed.

Hereby I will give some examples.

*Example No. 1.*—Suppose the electric motor 17 makes 600 R. P. M., the gear ratio of the main epicyclic gear train is $R=-.5$ and the ratio for the auxiliary epicyclic gear train is $R'=-.2$.

Then $$\frac{C-A}{S-A}=-.5$$

for main epicyclic gear train and $$\frac{C'-A'}{S'-A'}=-.2$$

for auxiliary epicyclic gear train.

From these expressions I write, $$C=1.5A-.5S \quad (2)$$
$$C'=1.2A'-.2S' \quad (3)$$

Under running conditions $C=C'$, also $S=S'$ and $A'=600$, therefore:

$$1.5A-.5S=1.2A'-.2S'$$

$$A=\frac{1.2\times 600}{1.5}+\frac{3}{1.5}S$$

$$A=480+.2S \quad (4)$$

When shaft 20 is at rest $S=0$ and $A=480$ and from Equations 2 and 3

$$C=1.5\times 480-.5\times 0=720$$
$$C'=1.2\times 600-.2\times 0=720$$

From these results it follows that when the engine makes 480 R. P. M. or less the driven shaft 20 will be at rest. Now, pressing the throttle pedal of the engine, this will tend to increase the speed of the control wheel 6 until it equalizes with the speed of the auxiliary control wheel 16 after which the process of real work starts, i. e., as wheel 6 is not allowed to increase its speed above that of the wheel 16 due to the irreversibility of the worm gearing a shunting of power to the driven shaft 20 takes place and it starts rotating. The immediate effect of this is to reduce the speed of wheel 16 (since the auxiliary driving member is kept at constant speed) which in turn will reduce the speed of wheel 6 and this in turn will further increase the speed of driven shaft 20, this cycle of operation, analogous to the electromagnetic "building up" in the dynamo machinery, going on until steady conditions are reached; a continued further depressing of the throttle pedal will continue increasing the speed of the driven shaft 20 until it reaches the speed of driving shaft 1, i. e., synchronous speed of all the members of the transmission is established.

From Equations 2, 3, and 4 values of the speeds of the driving and control members can be obtained for different speeds of the driven shaft 20

Thus when:

| S | A | C |
|---|---|---|
| 0 | 480 | 720 |
| 100 | 500 | 700 |
| 600 | 600 | 600 |

Also:

| S' | A' | C' |
|---|---|---|
| 0 | 600 | 720 |
| 100 | 600 | 700 |
| 600 | 600 | 600 |

*Example No. 2.*—Suppose the electric motor makes 1000 R. P. M., the gear ratio for the main epicyclic gear train is $R=-.25$ and the gear ration of the auxiliary epicyclic gear train is $R'=+.25$.

Then $$\frac{C-A}{S-A}=-.25 \qquad C-A=-.25S+.25A$$
$$C'-A'=.25S'-.25A'$$

and $$\frac{C'-A'}{S'-A'}=+.25 \qquad C=-.25S+1.25A$$
$$C'=.25S'+.75A'$$

Under running conditions in this case $C=C'$, $S=A'$ and $S'=1000$. Therefore $$-.25S+1.25A=.25\times 1000+.75S$$
$$A=200+.8S$$

From this results it follows that when the engine makes 200 R. P. M. or less the driven shaft 20 will be at rest. Pressing the throttle pedal will change the speeds of the different members of the epicyclic gear trains according to the following tabulations:

| S | A | C | and | S' | A' | C' |
|---|---|---|---|---|---|---|
| 0 | 200 | 250 | | 1000 | 0 | 250 |
| 500 | 600 | 625 | | 1000 | 500 | 625 |
| 1000 | 1000 | 1000 | | 1000 | 1000 | 1000 |

It will be evident to persons skilled in the art that the variable speed epicyclic gear transmission invented by me may incorporate different combinations and arrangements of:

1. Gear ratios.
2. Types of epicyclic gear drives such as external or internal planetary drives or differential epicyclic gearing.

Therefore I do not limit my invention to the specification given above and to the drawing attached herewith but to all different combinations of variable speed epicyclic gear transmissions comprising main and auxiliary epicyclic gear trains, worm gearing, one-way clutch and main and auxiliary input power units arranged to work on the principles of my invention or as stated in my claims hereby.

I claim:

1. A variable speed transmission for motor vehicles comprising a main epicyclic gear train and an auxiliary epicyclic gear train, each epicyclic gear train consisting of a driving member, a driven member and a floating member, said driving member of the main epicyclic gear train being connected to the main source of power, said driving member of the auxiliary epicyclic gear train being connected to an auxiliary source of power such as an electric motor, said driven members of both epicyclic gear trains being connected to the driven shaft of the vehicle, said floating members of both epicyclic gear trains being connected to one another through a worm gearing and a one-way clutch whereby at stand still of the vehicle and the engine running idle at/or below a predetermined speed said floating members are not locked to equal speeds and when the predetermined engine speed is exceeded automatic locking of the one-way clutch takes place which locks the floating wheels to equal speeds whereby the vehicle starts moving at a speed depending on the amount the predetermined engine speed is being exceeded.

2. A variable speed transmission for motor vehicles comprising a main epicyclic gear train and an auxiliary epicyclic gear train, each epicyclic gear train consisting of a driving member, a driven member and a floating member, said driving member of the main epicyclic gear train being connected to the main source of power, said driving member of the auxiliary epicyclic gear train being connected by means of a worm gearing to an auxiliary source of power such as an electric motor, said driven members of both epicyclic gear trains being connected to the driven shaft of the vehicle, said floating members of both epicyclic gear trains being connected to one another through a one way clutch whereby at stand still of the vehicle and the engine running idle at/or below a predetermined speed said floating gears are not locked to equal speeds and when the predetermined engine speed is exceeded automatic locking of the one way clutch takes place which locks the floating gears to equal speeds whereby the vehicle starts moving at a speed depending on the amount the predetermined engine speed is being exceeded.

3. A variable speed transmission comprising a main epicyclic gear train, and an auxiliary epicyclic gear train having an auxiliary source of power, a worm gearing and a one way clutch, each epicyclic gear train consisting of a driving member, a driven member and a floating member, a starting arrangement consisting of a pedal operated clutch and a one way brake, and means for connecting it into the transmission so that it will start the engine from the auxiliary source of power.

4. A variable speed transmission for motor vehicles comprising a main epicyclic gear train; and an auxiliary epicyclic gear train; each said gear train embodying a driving member, a driven member, and a floating member, said driving member of the main epicyclic gear train operatively connected to a main source of power, said driving member of the auxiliary epicyclic gear train operatively connected to an auxiliary source of power, said driven members of both epicyclic gear trains operatively connected to the driven shaft of the vehicle, and a one-way clutch and gearing operatively connecting the floating members of one epicyclic gear train to the floating members of the other epicyclic gear train; whereby, at a standstill of the vehicle with the motor idling, said floating members are not locked to equal speeds and when the idling speed is exceeded an automatic locking of the clutch takes place to move the floating members at equal speeds.

IVAN PETER POPOFF.